United States Patent
Swingley et al.

(10) Patent No.: US 10,662,518 B2
(45) Date of Patent: May 26, 2020

(54) ABRASION-RESISTANT WELD OVERLAY

(71) Applicant: KENNAMETAL INC., Latrobe, PA (US)

(72) Inventors: Thomas Swingley, Goshen, IN (US); Kevin Luer, Elkhart, IN (US); Rodrick Webber, Fenton, MO (US); James B. C. Wu, St. Louis, MO (US)

(73) Assignee: KENNAMETAL INC., Latrobe, PA (US)

( * ) Notice: Subject to any disclaimer, the term of this patent is extended or adjusted under 35 U.S.C. 154(b) by 786 days.

(21) Appl. No.: 15/243,313

(22) Filed: Aug. 22, 2016

(65) Prior Publication Data

US 2016/0355922 A1 Dec. 8, 2016

Related U.S. Application Data

(63) Continuation of application No. 11/463,967, filed on Aug. 11, 2006, now Pat. No. 9,422,616.

(60) Provisional application No. 60/707,738, filed on Aug. 12, 2005.

(51) Int. Cl.
| | |
|---|---|
| *C23C 4/134* | (2016.01) |
| *C23C 4/131* | (2016.01) |
| *C22C 29/08* | (2006.01) |
| *C23C 4/06* | (2016.01) |
| *C04B 37/02* | (2006.01) |
| *C22C 19/00* | (2006.01) |
| *C22C 19/05* | (2006.01) |
| *C23C 4/10* | (2016.01) |
| *B23K 103/08* | (2006.01) |
| *B23K 103/00* | (2006.01) |

(52) U.S. Cl.
CPC ............ *C23C 4/134* (2016.01); *C04B 37/021* (2013.01); *C22C 19/007* (2013.01); *C22C 19/058* (2013.01); *C22C 29/08* (2013.01); *C23C 4/06* (2013.01); *C23C 4/10* (2013.01); *C23C 4/131* (2016.01); *B23K 2103/08* (2018.08); *B23K 2103/52* (2018.08); *C04B 2237/36* (2013.01); *C04B 2237/40* (2013.01)

(58) Field of Classification Search
CPC ............ B23K 2103/08; B23K 2103/52; C04B 2237/36; C04B 2237/40; C04B 37/021; C22C 19/007; C22C 19/058; C22C 29/08; C23C 4/06; C23C 4/10; C23C 4/131; C23C 4/134
USPC .............. 219/76.12, 145.31, 145.32, 145.41, 219/145.51, 146.23, 146.41, 146.51; 420/436; 148/460, 550
See application file for complete search history.

(56) References Cited

U.S. PATENT DOCUMENTS 3,758,124 A * 9/1973 Weinberger ................. F16J 9/22
428/564
5,964,966 A * 10/1999 Goyal ..................... C22C 19/03
148/426

(Continued)

*Primary Examiner* — Dana Ross
*Assistant Examiner* — Joe E Mills, Jr.
(74) *Attorney, Agent, or Firm* — Larry R. Meenan

(57) ABSTRACT

A material blend for deposition of an abrasion-resistant overlay onto a metal substrate comprising a first metal particle component, a second metal particle component, and a carbide particle component and a method for the application thereof, wherein the overlay process conditions and the homogeneity of tungsten carbide distribution in the overlay are improved.

19 Claims, 5 Drawing Sheets

(56) References Cited

U.S. PATENT DOCUMENTS

2004/0134309 A1* 7/2004 Liu .......................... B22F 3/16
                                                                                                             75/241
2005/0191482 A1* 9/2005 Liu ....................... C22C 29/005
                                                                                                             428/323

* cited by examiner

ABRASION-RESISTANT WELD OVERLAY

REFERENCE TO RELATED APPLICATIONS

This application is a continuation of U.S. patent application Ser. No. 11/463,967 filed Aug. 11, 2006 which claims priority from U.S. provisional application Ser. No. 60/707,738 filed on Aug. 12, 2005, the entire disclosure of which is incorporated herein by reference.

FIELD OF THE INVENTION

This invention generally relates to an overlay of tungsten carbide and metal onto a metal substrate to provide abrasion resistance.

BACKGROUND OF THE INVENTION

In severely abrasive conditions, protecting working surfaces is essential in many applications, such as with earth-moving equipment, to facilitate proper functioning. For example, when shoveling oil sand, the shovel teeth need an abrasion-resistant overlay for protection against excessive wear. Such overlays are typically a composite of hard particles, such as tungsten carbide, in a nickel alloy matrix, which are typically applied by welding.

Plasma transferred arc welding (PTA) is often chosen to deposit abrasion-resistant overlays because it is capable of producing high quality overlays with high efficiency. In addition, this welding technique can use a variety of materials, often in powder form, as consumables.

A standard PTA welding operation is shown in FIG. 1. A plasma arc is established between the electrode 12 and the workpiece 13 by ionizing the main gas, which is typically argon. Powder 14 is fed with an inert carrying gas through the nozzle 15 to the plasma arc 11, at which point it is melted and deposited onto the workpiece 13. An inert shielding gas 16 is also fed through a porous "diffuser" to the welding zone to minimize oxidation.

The most commonly used material blends or composite powders comprise (a) nickel alloy powder comprising silicon and boron, and (b) a tungsten carbide powder. Such powders are "self-fluxing," and have the following two advantages:

(1) they have a relatively low melting point such that heat input is reduced, thereby avoiding excessive dilution with the base metal, which deteriorates the overlay's properties; and (2) they yield overlay alloys with good abrasion resistance because hard phases of borides and silicides are formed therein.

However, there remain several deficiencies with traditional PTA welding when the described common material blends or composite powders are used to form weld overlays. First, the powder particles tend to adhere to or collect on the spray nozzle and the diffuser within a short time of beginning operation.
Consequently, welding can only be done intermittently, with frequent stops required to remove the material from the equipment. The welding operation's efficiency is therefore reduced, and the final overlay has an increased propensity to form defects that originate when the weld operation is re-started.

Second, because tungsten carbide has a higher density than that of the nickel alloy matrix, it tends to settle to the bottom of the weld pool before the overlay solidifies. This results in a heterogeneous distribution of hard tungsten carbide particles, where the top portion of the overlay has fewer particles to promote adequate wear resistance in the overlay.

Finally, there is often an undesirable reaction between the tungsten carbide and nickel alloy in material blends comprising both powders. This reaction is further evident when chromium is present and/or when the tungsten carbide is a eutectic carbide, namely $WC+W_2C$, which is less stable than WC. Specifically, chromium reacts with $W_2C$ to form a much softer chromium-rich complex carbide, e.g., $M_{23}C_6$, and W that is easily oxidized. Such a reaction is detrimental to the alloy's wear resistance.

SUMMARY OF THE INVENTION

Among the several objects of the present invention, therefore, is the provision of an improved abrasion-resistant weld overlay.

Generally, therefore, the present invention is directed to a material blend for deposition of an abrasion-resistant overlay onto a metal substrate, the blend comprising a first metal particle component comprising first metal particles selected from the group consisting of Ni, Fe, Co, and mixtures thereof; a second metal particle component comprising second metal particles selected from the group consisting of Al, Ti, Y, V, Nb, Ta, Zr, Hf, rare earth elements, and mixtures thereof; and a carbide particle component comprising WC particles.

In another aspect, the present invention is directed to a method of enhancing abrasion-resistance of a metal substrate comprising depositing an abrasion-resistant overlay onto a surface of the metal substrate by plasma transfer arc welding deposition of molten material formed from the above-described material blend.

These and other objects, features, and advantages of the invention will become apparent from the following detailed description.

BRIEF DESCRIPTION OF THE FIGURES

FIG. 6a is a photograph of a cross section of the weld overlay sample from FIG. 5a.

DETAILED DESCRIPTION OF PREFERRED EMBODIMENTS

Figure 1:
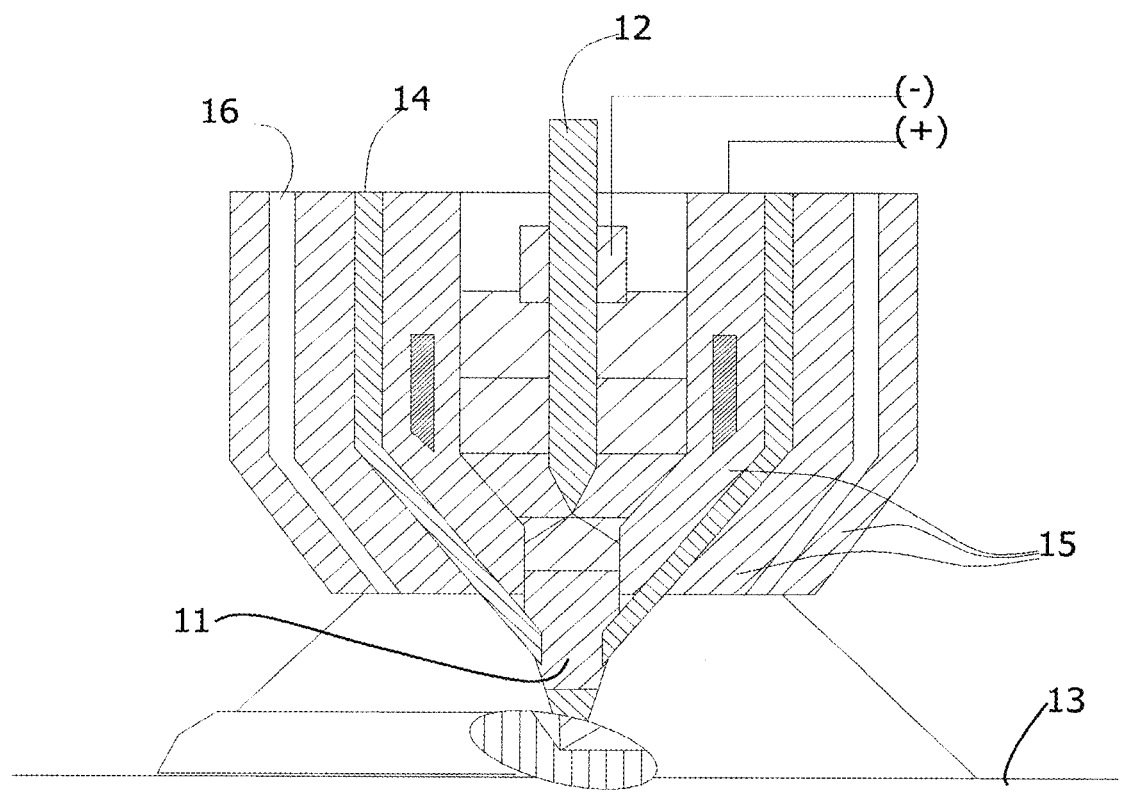
FIG. 1 is a schematic showing a typical PTA weld overlay operation.

In accordance with this invention, a material blend for use in producing a weld overlay on a metal substrate has been discovered, wherein the material blend drastically minimizes powder adhesion or collection on the weld spray nozzle, improves the homogeneity of tungsten carbide distribution in the overlay, and reduces the interaction between tungsten carbide and the matrix. Generally, the material blend comprises a first metal particle component, a second metal particle component, and a carbide particle component.

The material blend's first metal particle component typically acts as the material blend's majority constituent or matrix material. The first metal particle component comprises first metal particles selected from the group consisting of Ni, Fe, Co, and alloys and mixtures thereof. The first metal particle component may further comprise alloying elements selected from the group consisting of Cr, Si, B, C, Ni, and mixtures thereof. In one embodiment, the first metal particle component is a Ni alloy, such as a Ni—Cr alloy with other alloying elements in amounts of less than 10% each. For example, in one embodiment, this component contains at least about 75% of the major constituent (Ni, Fe, or Co) and the balance being alloying elements. The first metal particle component typically constitutes between about 15% and about 35% of the material blend. All percentages herein are by weight unless stated otherwise.

The material blend's second metal particle component acts as a reactive element with the first metal particle component. Generally, the second metal particle component comprises a second metal particle that readily reacts with oxygen to form an oxide; one that is compatible with the other elements of the material blend; and one that can be of a form to be utilized in a weld overlay operation, such as powder form. More specifically, the second metal particle component contains an element which comprises a material that is selected from the group consisting of Al, Ti, Y, V, Nb, Ta, Zr, Hf, rare earth elements, and alloys and mixtures thereof. The second metal particle component may further comprise a majority alloying element selected from the group consisting of Ni, Fe, Co, and mixtures thereof. For example, in one preferred embodiment, the second metal particle component comprises at least about 80%, preferably at least about 90%, of one of these elements: Ni, Fe, or Co. In a particularly preferred embodiment, the majority element in the second metal particle component (e.g., Ni) is the same as the majority element in the first metal particle component. The second metal particle component typically constitutes between about 3% and about 20% of the material blend.

Without being bound by a particular theory, it is believed that the presence of one or more of the second metal particle oxides in the molten material blend has the following effects: (1) the molten metal is coated with a very thin oxide film, as are the molten metal spatters from the weld operation; (2) they generally tend to make the molten metal more sluggish or viscous, thereby retarding settlement of the tungsten carbide particles in the molten weld pool; and (3) they reduce the chemical activity of chromium in the molten metal, allowing the tungsten carbide particles to remain essentially intact.

Of the second metal particles, Al is the most economic choice. Aluminum can be added into the first metal particle by either alloying or blending with an Al-comprising powder. One preferred second metal particle is a Ni—Al alloy. Alloyed Ni—Al in this context means each second metal particle is an alloy of Ni and Al, melted together and solidified. This is in contrast to distinct Ni and Al particles simply bonded together as an aggregate. Aluminum is also a preferred second metal particle because it readily forms a thin film of aluminum oxide on the surface of the molten metal spatter droplets, thereby making these droplets less likely to collect or accumulate on the spray nozzle surface. Furthermore, if the material blend comprises Cr, which is also known to readily form an oxide film on the molten metal, Al appears to make this oxide film stronger. Conceivably, if the material blend is free of Cr, its oxidation resistance is reduced and higher Al content would be needed to retain desirable oxidation resistance levels.

The concentration of the second metal particles in the second metal particle component should be kept low enough to avoid deleterious physical properties in the overlay. In the embodiment where Al is the second metal particle, excessive Al can lead to the formation of brittle intermetallic compounds, such as nickel aluminides, iron aluminides, cobalt aluminides, and boron aluminides. These aluminides could impart brittleness to the PTA overlay, leading to possible separation of the overlay from the metal substrate. Preferably, the concentration of the second metal (i.e., the reactive element, such as Al) in the second metal particle component is between about 0.2% and about 5%.

The carbide particle component consists essentially of tungsten carbide (WC) particles, without any elemental binders, such as Co. In other words, tungsten and carbon are the only intentional elements in the carbide particle component. Further, before the WC particles are introduced to the other particle components of the material blend, the WC particles are not yet associated with any other elements. Currently, there are two types of tungsten carbides available commercially. The first is the stoichiometric tungsten carbide composition of 93.9% W and 6.1% C. The second is the eutectic tungsten carbide composition of 96.1% W and 3.9% C. This eutectic WC can be formed by arc-melting tungsten-comprising graphite crucibles. At a high temperature, the graphite reacts with W to form the eutectic $WC+W_2C$. The molten eutectic $WC+W_2C$ is then cast as an ingot and crushed into powder. Alternatively, the $WC+W_2C$ ingot is in the shape of bar, such that it may be spun to generate spherical powder upon being heated by a plasma beam. This eutectic $WC+W_2C$ is less stable than stoichiometric WC. When eutectic $WC+W_2C$ is used in the material blend for PTA welding, it tends to react with the Cr in the matrix powder, thereby reducing the effectiveness of WC in wear resistance. As noted above, adding Al to the material blend mitigates this problem. The carbide particle component typically constitutes between about 50% and about 80% of the material blend.

Each of the first metal particle, the second metal particle, and the WC particle may be in any form suitable for a weld overlay operation, with one preferred form being powder. Use of the second metal particles in their pure elemental state is less preferred since some may be pyrophoric in fine powder form. As such, in one preferred embodiment, the second metal particles are in the form of alloy particles.

EXAMPLES

Further illustration of the invention is provided by the following examples:

Example 1

A material blend for deposition of an abrasion-resistant overlay onto a metal substrate was formed by blending about 25% first metal particle component, about 10% second metal particle component, and about 65% of carbide particle component (stoichiometric WC). The particle components comprised the following approximate %:

First Metal Particle Component

| | |
|---|---|
| Cr | 11.0% |
| Si | 4.0% |
| Fe | 2.7% |
| B | 2.3% |
| C | 0.45% |
| Ni | balance |

Second Metal Particle Component

| | |
|---|---|
| Ni | 95% |
| Al | 5% |

Carbide Particle Component

| | |
|---|---|
| W | 93.9% |
| C | 6.1% |

Figure 2A:
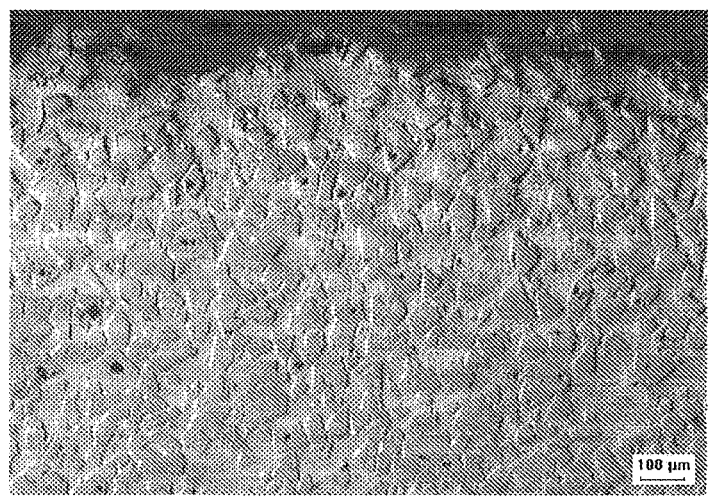
FIG. 2A is a photomicrograph showing the microstructure of a weld overlay formed according to this invention near the surface of the overlay.
Figure 2B:
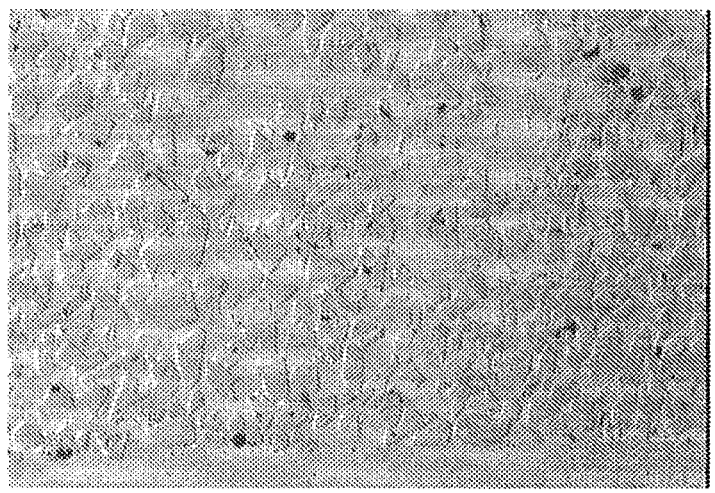
FIG. 2B is a photomicrograph showing the microstructure of a weld overlay formed according to this invention near the bond interface with the substrate.

After blending, the material blend comprised approximately 0.5% aluminum. The material blend was then utilized in a PTA weld overlaying operation. The overlay was characterized by a microstructure as shown in FIG. 2, which shows uniformly distributed tungsten carbide particles.

Figure 3:
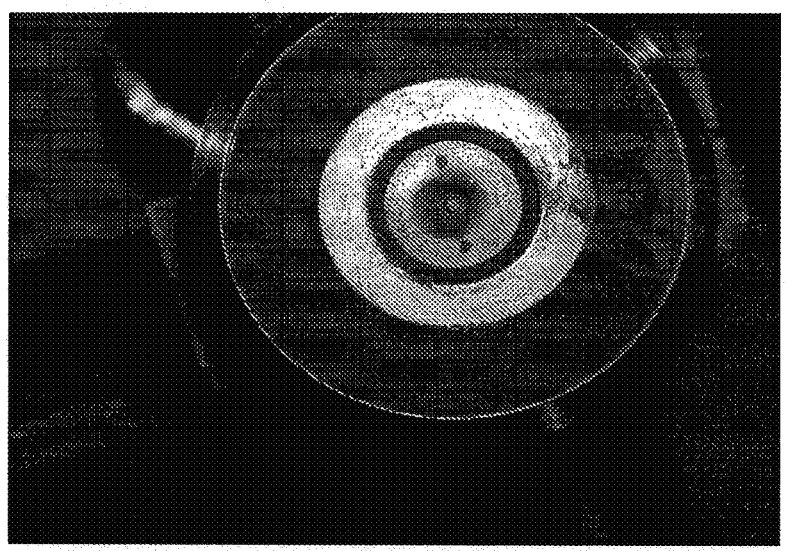
FIG. 3 is a photograph of a PTA spray nozzle after spraying with a weld overlay material blend according to this invention.
Figure 4:
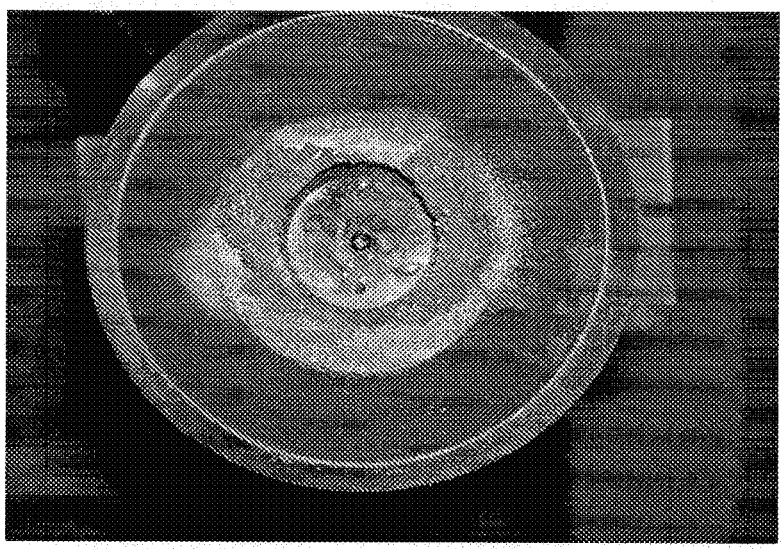
FIG. 4 is a photograph of a PTA spray nozzle after spaying with a traditional weld overlay material blend.

After welding this material blend for about 15 minutes, the spray nozzle remained substantially free of spatter particles attached to its bottom surface, as shown in FIG. 3. For comparison, a material blend of just first metal particle component and the stoichiometric tungsten carbide was welded for about 15 minutes using the same type of equipment. With this blend, the bottom nozzle surface was loaded with spatter particles, as shown in FIG. 4.

Example 2

To examine the impact of the immediate invention, two samples were prepared using PTA to form two weld overlay samples. To form Sample 1, a material blend for deposition was formed by blending about 60% of carbide particle component (stoichiometric WC) and about 40% of the alloy Deloro 50, which is a nickel-based alloy comprising the following, by approximate weight percentage: 11% Cr, 3.9% Si, 2.7% Fe, 2.3% B, and 0.45% C. To form Sample 2, a material blend for deposition was formed by blending about 60% of carbide particle component (stoichiometric WC) and about 25% of Deloro 50, and about 15% of an alloy comprising about 95% Ni and about 5% Al. After blending, the material blend for the second sample comprised about 0.75% Al.

Figure 5A:
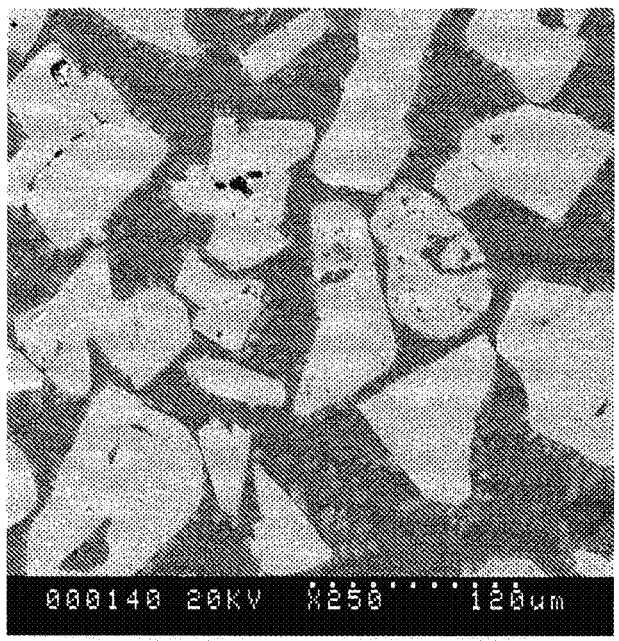
FIG. 5a is a photomicrograph of a weld overlay material blend of WC in an Al-free matrix.
Figure 5B:
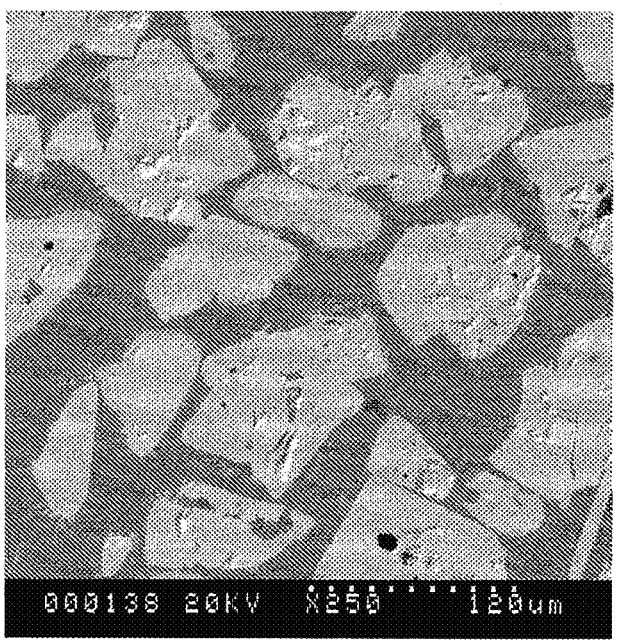
FIG. 5b is a photomicrograph of a weld overlay material blend of WC in an matrix comprising Al.

The material blends were then utilized in a PTA weld overlaying operation. The resulting weld overlays from Samples 1 and 2 were cross-sectioned and are shown in FIGS. 5A and 5B, respectively. As the microstructure of the samples show, the addition of the second metal particulate component to Sample 2, which was formulated according to the present invention, effectively retarded the reaction between the WC and the first metal component. FIG. 5A shows that the WC particles reacted with the Ni-based matrix to form spheroidal particles in the overlay formed from Sample 1. The addition of Al in Sample 2 reduces the reaction between the Ni-based matrix and the WC, as evidenced by the smaller spheroidal particles. It is expected that an increased concentration of Al would further retard the reaction between the WC and the Ni-based matrix.

Example 3

Figure 6A:
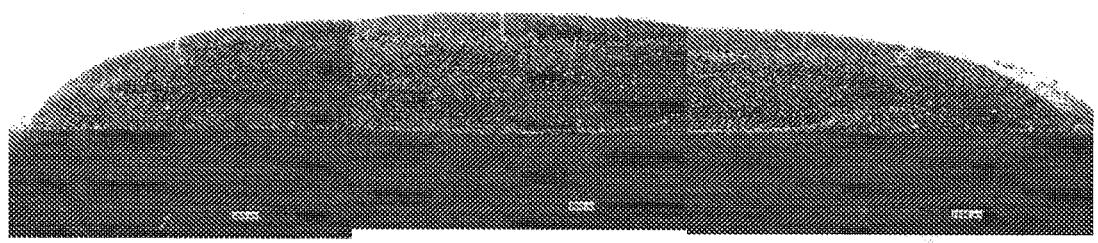
Figure 6B:
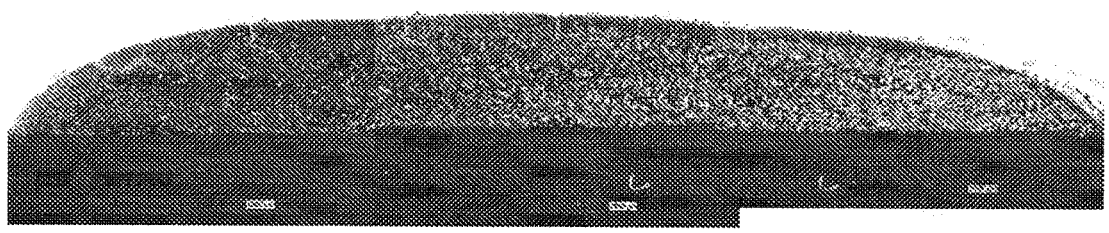
FIG. 6b is a photograph of a cross section of the weld overlay sample from FIG. 5b.

The two weld overlay samples from Example 2 were further examined with regard to the distribution of the WC particles throughout the overlay's microstructure. The weld overlays formed from Samples 1 and 2 are shown in FIGS. 6A and 6B, respectively. FIGS. 6A and 6B show that both weld overlay samples comprise a layer of WC-free material at the top of the overlay, with fractures present in both samples. However, the WC-free layer is significantly thinner in the weld overlay sample formed from Al-comprising Sample 2 as contrasted to the one formed from Sample 1. This WC-free layer marks the distribution of WC within the Ni-based matrix. As such, it is concluded that the Al additive in Sample 2 promotes a more uniform distribution of WC particles within the overlay's Ni alloy matrix.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

The foregoing relates to a limited number of embodiments that have been provided for illustration purposes only. It is intended that the scope of invention is defined by the appended claims and there are modifications of the above embodiments that do not depart from the scope of the invention.

The invention claimed is:

1. A material blend for deposition of an abrasion-resistant overlay onto a metal substrate, the blend comprising:
    a first powder metal component comprising first powder alloy selected from the group consisting of Ni alloy, Fe alloy, Co alloy and mixtures thereof;
    a second powder metal component comprising second alloy powder including one or more elements selected from the group consisting of Al, Ti, Y, V, Nb, Ta, Zr, Hf and rare earth elements; and
    a tungsten carbide particle component, wherein the tungsten carbide particle component is present in an amount of 50 to 80 weight percent of the material blend, and the second powder metal component is present in an amount of 3 to 20 weight percent of the material blend.

2. The material blend of claim 1, wherein the first powder metal is Ni alloy.

3. The material blend of claim 2, wherein the Ni alloy comprises Cr.

4. The material blend of claim 2, wherein Ni is present in the alloy in an amount of at least 75 weight percent.

5. The material blend of claim 1, wherein the first powder metal component is present in an amount of 15 to 35 weight percent of the material blend.

6. The material blend of claim 3, wherein the Ni—Cr alloy further comprises at least one of Si, B and C.

7. The material blend of claim 1, wherein at least 80 weight percent of the second powder alloy is Ni, Fe or Co.

8. The material blend of claim 7, wherein at least 80 weight percent of the second powder alloy is Ni.

9. The material blend of claim 7, wherein the second powder alloy includes Al.

10. A material blend for deposition of an abrasion-resistant overlay onto a metal substrate, the blend comprising:
    a first powder metal component comprising a first powder alloy including Ni in an amount of at least 75 weight percent;

a second powder metal component comprising second alloy powder including one or more elements selected from the group consisting of Al, Ti, Y, V, Nb, Ta, Zr, Hf and rare earth elements; and a tungsten carbide particle component, wherein the tungsten carbide particle component is present in an amount of 50 to 80 weight percent of the material blend.

11. The material blend of claim 10, wherein the first powder alloy further comprises Cr.

12. The material blend of claim 1, wherein the first powder metal component is present in an amount of 15 to 35 weight percent of the material blend.

13. The material blend of claim 10, wherein the second alloy powder further comprises a majority alloying element selected from the group consisting of Ni, Fe, and Co.

14. The material blend of claim 13, wherein at least 80 weight percent of the second alloy powder is Ni, Fe, or Co.

15. The material blend of claim 10, wherein the second powder metal component is present in an amount of 3 to 20 weight percent of the material blend.

16. A material blend for deposition of an abrasion-resistant overlay onto a metal substrate, the blend comprising:

a first powder metal component comprising first powder alloy selected from the group consisting of Ni alloy, Fe alloy, Co alloy and mixtures thereof;

a second powder metal component comprising second alloy powder including a majority alloying element of Ni, Fe, or Co in an amount of at least 80 weight percent, and one or more additional elements selected from the group consisting of Al, Ti, Y, V, Nb, Ta, Zr, Hf and rare earth elements; and a tungsten carbide particle component, wherein the tungsten carbide particle component is present in an amount of 50 to 80 weight percent of the material blend.

17. The material blend of claim 16, wherein the first powder alloy further comprises Cr.

18. The material blend of claim 16, wherein the first powder metal component is present in an amount of 15 to 35 weight percent of the material blend.

19. The material blend of claim 10, wherein the second powder metal component is present in an amount of 3 to 20 weight percent of the material blend.

* * * * *